United States Patent [19]

Ishimaru et al.

[11] 4,435,629
[45] Mar. 6, 1984

[54] COMBINATION HEATING APPARATUS

[75] Inventors: Kimio Ishimaru, Osaka; Kenichi Abe, Omiya, both of Japan

[73] Assignee: Osaka Gas Co., Ltd., Osaka, Japan

[21] Appl. No.: 293,310

[22] Filed: Aug. 17, 1981

[30] Foreign Application Priority Data

Aug. 22, 1980 [JP] Japan .................................. 55-114819

[51] Int. Cl.³ ............................ F26B 3/34; H05B 6/64
[52] U.S. Cl. .................................. 219/10.55 A; 34/1; 219/10.55 R
[58] Field of Search ................. 219/10.55 R, 10.55 E, 219/10.55 F, 10.55 M, 10.55 A, 10.47, 10.49, 10.57, 10.81, 6.5, 326, 540; 34/1, 4; 165/104.26

[56] References Cited

U.S. PATENT DOCUMENTS

| | | | |
|---|---|---|---|
| 3,056,877 | 10/1962 | Schmidt et al. | 219/10.55 R |
| 3,622,733 | 11/1971 | Smith et al. | 219/10.55 A |
| 3,739,130 | 6/1973 | White | 34/1 |
| 3,947,244 | 3/1976 | Lazaridis | 219/326 |
| 3,974,355 | 8/1976 | Bach | 219/10.81 |
| 4,095,647 | 6/1978 | Asselman et al. | 219/540 |
| 4,303,820 | 12/1981 | Stottmann et al. | 219/10.81 |

Primary Examiner—B. A. Reynolds
Assistant Examiner—Alfred S. Keve
Attorney, Agent, or Firm—Armstrong, Nikaido, Marmelstein & Kubovcik

[57] ABSTRACT

A heating apparatus is provided comprising microwave heating having microwave leakage-type waveguides, each waveguide having a plurality of microwave emitting openings which extend along the advancing direction of microwave in a stepping-stone pattern. The waveguides are disposed in parallel with one another. Radiation heating is provided having heat conducting members which are disposed along upper and lower surfaces of the microwave leakage-type waveguides, and high frequency heating is provided which utilizes the microwave leakage-type waveguides as electrodes.

5 Claims, 5 Drawing Figures

COMBINATION HEATING APPARATUS

BACKGROUND OF THE INVENTION

This invention relates to a heating apparatus which is effective for use as a heating means in a freeze-drying apparatus or a defreezing apparatus for food.

If food is freeze-dried, a product is obtained having the characteristic features of color, aroma, taste and vitamins of the raw material comparatively well preserved therein. When cold water, hot water or the like is later added to the freeze-dried material, the same is easily restored to its original state.

If freeze-drying is used for processing food, transportation or storage of the processed food is improved in efficiency. Accordingly, local or seasonal limitations of food production can be eliminated and the rationalization of the food industry can be carried out.

Additionally, the dried product can be preserved for long periods without requiring any special equipment, such as a refrigerator or the like. Cooking thereof is also simple, so that the same is useful for improvement in one's diet.

However, the freeze-drying of food requires that frozen food be dried by heat. It takes a long time, such as 6-10 hours, to dry the food when only a radiation heating apparatus, such as an electric heat-type heating apparatus or the like, is used.

In this respect, the inventors of the present invention have previously succeeded in inventing a heating apparatus including a microwave heating means using leakage-type waveguides having such a characteristic property that any material to be heated is heated from the inside thereof. The microwave heating means is combinedly used in the radiation heating apparatus so that the food to be heated may be heated from the inside and the outside thereof at the same time. Thus, the drying time required for obtaining the same freeze-dried food need only be about 2 hours.

However, the requirement of 2 hours for drying frozen food is still too much, and is unsuitable from the viewpoint of productivity. In view of this, as a result of further experimental research, the inventors have found that heating by a high frequency of 1000 KHz or so is effective in defreezing.

Namely, to explain in more detail, when a dielectric loss coefficient (tan δ) of water is measured by holding water as dielectric between electrode plates and a super-high frequency of 3 MHz is applied between the electrode plates, it is found to be $1,570 \times 10^{-4}$. In the case of ice, it is so extremely small as $9 \times 10^{-4}$. Accordingly, a super-high frequency heating apparatus requires much time for melting of ice and is not so effective.

Whereas, when the dielectric loss coefficient is measured in the case when a high frequency of 1000 KHz is applied between the electrode plates, it becomes as small as $400 \times 10^{-4}$ for water; while it becomes as large as $1200 \times 10^{-4}$ for ice.

Accordingly, if heated by the high frequency of 1000 KHz or so, a layer of ice covering the surface of food to be heated rapidly becomes molten, so that the drying time by heat can be shortened.

This invention has been made on the basis of this finding. It has been achieved that, according to this invention, using a high frequency heating means together with a radiation heating means and a microwave heating means quickens defreezing, and the necessary frozen food drying time is shortened to about 1 hour.

Next, this invention will be explained with reference to some embodying examples in which this invention is suitably applied to a heating apparatus for a vacuum freeze-drying apparatus for frozen food.

DETAILED DESCRIPTION OF THE PREFERRED EMBODIMENTS

Figure 1:
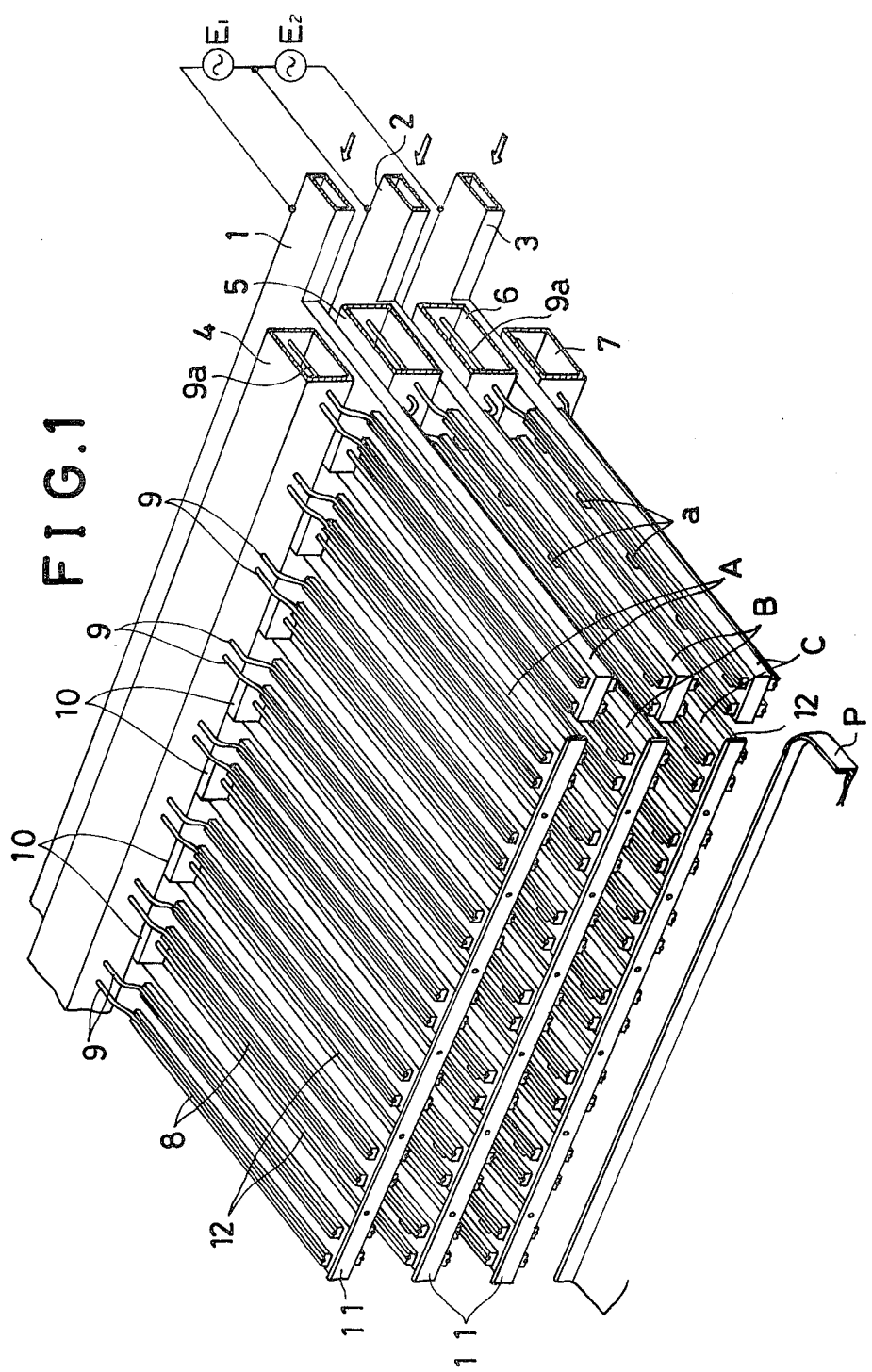
FIG. 1 is a perspective view of one embodiment of this invention.

Numerals 1, 2 and 3 denote main waveguides of a microwave heating means. These main waveguides 1, 2, 3 are so arranged as to be in three stages in the vertical direction, leaving a regular interval between adjacent stages. Each stage has plural microwave leakage-type waveguides projecting sideways therefrom in parallel with one another in the form of teeth of a comb. Microwave emitting openings a are made in a stepping-stone pattern in a lower surface of each of the microwave leakage-type waveguides A, A, A . . . projecting from the main waveguide 1, in upper and lower surfaces of each of the microwave leakage-type waveguides B, B, B . . . projecting from the main waveguide 2, and in an upper surface of each of the microwave leakage-type waveguides C, C, C . . . projecting from the main waveguide 3, respectively.

Hot blast ducts 4, 5, 6, 7 for a radiation heating means are disposed along the main waveguides 1, 2, 3. Every pair of heat pipes 9 which serve as heat conducting members are in close contact with, and fixed to, upper and lower surfaces of each of the foregoing microwave leakage-type waveguides A, B, C through respective receiving seats 8 and have their one end portions 9a inserted in and fixed to the respective corresponding ones of those ducts 4, 5, 6, 7.

Respective adjacent upper and lower ones of these hot blast ducts 4, 5, 6, 7 are interconnected through heat conducting blocks 10 serving also as spacers. Subsidiary heat pipes 12 are also provided, each of which is fixed at both ends thereof to a connecting member 11 which extends across and connects free ends of each of the microwave leakage-type waveguides A, A, A . . . , B, B, B . . . , C, C, C . . . and to the corresponding one of the heat conducting blocks 10.

A high frequency oscillator $E_1$ of 1000 KHz for a high frequency heating means is provided in which the microwave leakage-type waveguides A, A, A . . . and the microwave leakage-type waveguides B, B, B . . . provided on the main waveguides 1, 2 are used as its electrodes. A second high frequency oscillator $E_2$ of 1000 KHz for a high frequency heating means is provided in which the microwave leakage-type waveguides B, B, B . . . and the microwave leakage-type waveguides C, C, C . . . provided on the main waveguides 2, 3 are used as its electrodes. A frozen food receiving pan P, which is made of electric wave transmissible plastics such as "Teflon" or the like, is arranged to be placed on each of the microwave leakage-type waveguides B, B, B... and C, C, C... which have their respective heat pipes 9.

The foregoing heating means are provided in a drying chamber (not illustrated).

Next, operation and effect of the apparatus of this example will be explained as follows:

Frozen food in the receiving pans P,P is placed on the microwave leakage-type waveguides B and C having the respective heat pipes 9, and the air in the drying chamber is evacuated so as to form a vacuum (0.1-0.5 Torr). Thereafter, hot blast is blown through the hot blast ducts 4, 5, 6, 7; microwaves from a microwave oscillator (not illustrated) are applied through the main waveguides 1, 2, 3; and the main waveguides 1, 2 and the main waveguides 2, 3 are applied with high frequency voltages from the high frequency oscillators $E_1$, $E_2$.

In this manner, the heat pipes 9 receive heat from the hot blast flowing through the hot blast ducts 4, 5, 6, 7 and conduct the heat to the microwave leakage-type waveguides A, B, C so as to heat them. Thereby, the frozen food in each receiving pan P is heated by the radiation heat thereof.

At the same time, additionally, the microwaves flowing through the main waveguides 1, 2, 3 leak out from the microwave emitting openings a made in the microwave leakage-type waveguides A, A, A..., B, B, B..., C, C, C... connected to the respective main waveguides 1, 2, 3 and the frozen food is applied with the leaked microwaves so as to be heated from the interior thereof.

Additionally, in the meantime, the ice covering the frozen food or contained therein is within the electric field of the high frequency heating means using the waveguides A, B, C as electrodes so that the ice is heated to melt by the high frequency heating means.

As mentioned above, with this heating apparatus, the frozen food is subjected to a heating action by the radiation heating means using as heaters the heat pipes and the microwave leakage-type waveguides, to a heating action by the high frequency heating using as its electrodes the microwave leakage-type waveguides, and to a heating action by the microwaves emitted from the microwave leakage-type waveguides, so that the same is defrozen and heated from outside and inside and the frozen food is rapidly dried.

The water evaporated is immediately discharged from the drying chamber to the exterior thereof by a vacuum apparatus.

Thus, according to this invention, by the high frequency heating, defreezing is quickened and evaporation of the water is accelerated and, as a result, the necessary heat drying time is considerably shortened. Specifically, the present invention makes it possible to shorten the necessary drying time to about ½ that required for the previously proposed heating apparatus using both the radiation heating means and the microwave heating means.

It is also an advantage that, as for an additional equipment, it is only sufficient to connect output terminals of the high frequency oscillators $E_1$, $E_2$ to the main waveguides 1, 2, 3 so that assembling work of this invention apparatus is easy and an industrial value thereof is high.

The main waveguides 1, 2, 3 may be increased or decreased in number according to a desired size of the heating apparatus.

Figure 3:
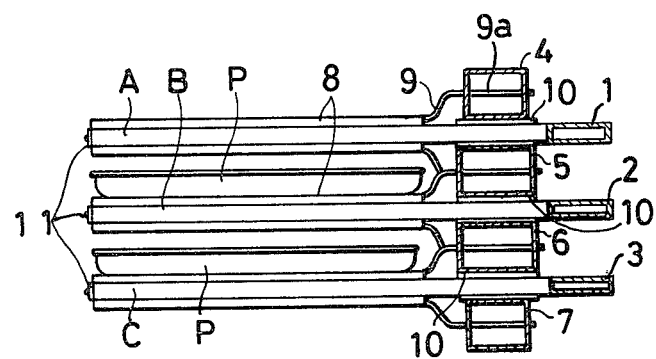
FIG. 3 is an elevational side view thereof.
Figure 4:
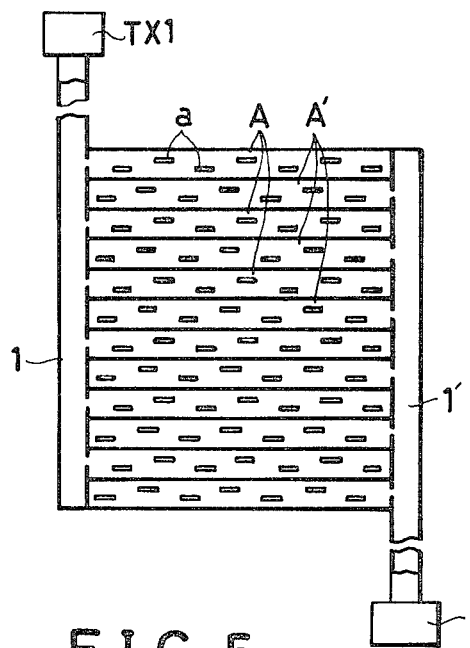
FIG. 4 is a sectional top plan view showing a construction of an important portion of a second embodiment.

FIG. 4 shows a constructional arrangement of an important portion of a modified example of this invention. Respective groups of six microwave leakage-type waveguides A, A, A..., A', A', A'..., each having at its lower surface microwave emitting openings a in a stepping-stone pattern, are connected at their respective one ends in the form of comb teeth to respective main waveguides 1, 1' connected to respective microwave oscillation means TX1, TX2. The microwave leakage-type waveguides A, A, A..., A', A', A'... are disposed alternately with one another in such a manner as when the teeth of two combs are meshed with one another. Microwave leakage-type waveguides B, B, B..., B', B', B'... and microwave leakage-type waveguides C, C, C..., C', C', C'... are similarly provided (though not illustrated) and the remainder of the construction is the same as in the Example shown in FIGS. 1-3.

The microwaves discharged from the microwave emitting opening a of each of the leakage waveguides A, A, A..., A', A', A'... is damped in its intensity accordingly as it goes away from the connecting side of the leakage-waveguide with the main waveguide, so that the heating temperature is lowered accordingly as it is distant from the main waveguide.

However, according to the apparatus shown in FIG. 4, for improving this defect, the microwave leakage-type waveguides A, A, A... A', A', A'... different in electric wave flowing direction one from another are arranged alternately one with another, so that the material to be heated can be heated nearly uniformly.

The microwave emitting openings are in a stepping-stone pattern in this example, but the same is not limited thereto and the openings may be long slits.

In a case where a microwave heating means is used as a heating means of a vacuum freeze-drying apparatus, if the vacuum degree is heightened, electric discharge is liable to occur. When such electric discharge takes place, the heating ability is lowered. If, however, the microwave openings are in the form of a long slit, the electric wave is emitted in good distribution condition and consequently the terminal end voltage of the microwave leakage-type waveguide is so lowered that there is brought about such an effect that the electric discharge is prevented. Thus, the openings in slit form are an effective form for the case where the drying chamber is made to be of a high vacuum degree.

Figure 5:
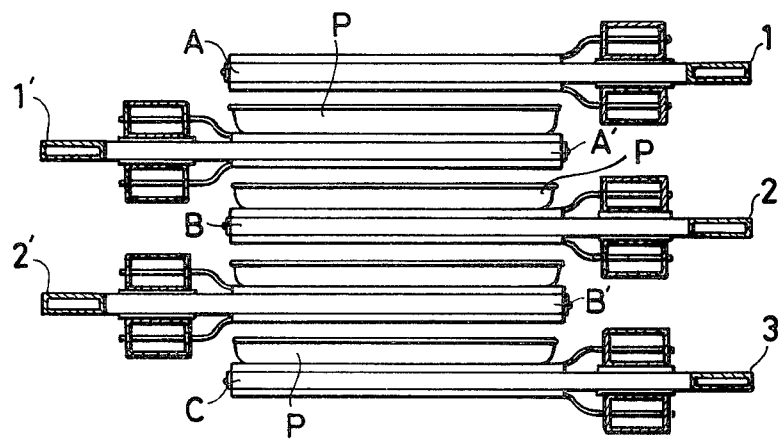
FIG. 5 is a sectional side view showing a construction of an important portion of a third embodiment.

For obtaining the same effect as that brought about by the apparatus shown in FIG. 4, such a one can be considered that a pair of apparatus, each of which is the same type as the heating apparatus shown in FIG. 1, are prepared. As shown in FIG. 5, these are so disposed as to face one another and microwave leakage-type waveguides A, A, A, ..., B, B, B..., C, C, C... thereof and microwave leakage-type waveguides A', A' A'..., B', B', B'... thereof are so inserted alternately one with another as to be disposed alternately one with another in layers, and it is so arranged that there microwaves are flown therethrough in mutually reverse directions.

Figure 2:
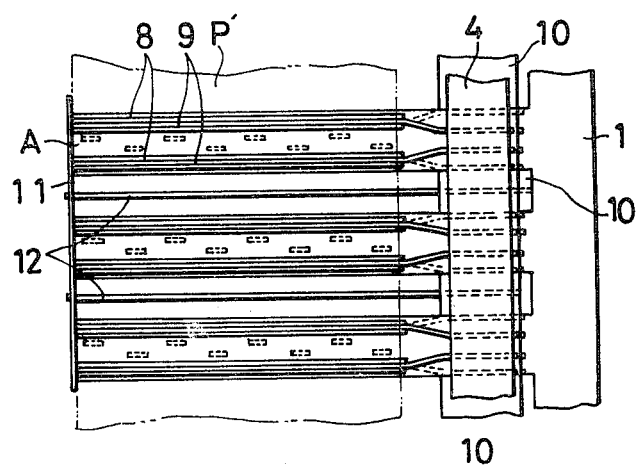
FIG. 2 is a top plan view thereof.

In the example shown in FIGS. 1-3, it has been explained about the hot blast ducts 4, 5, 6, 7 through which hot blast is blown. However, those ducts may be used for any desired hot medium ducts through which hot medium such as heated vapor, hot water, hot medium oil or the like flows. It is also a matter of course that electric members, such as electric heaters, are used as the heat conducting members, instead of the heat pipes and the hot medium ducts.

This invention heating apparatus can be used not only for a vacuum freeze-drying apparatus or a defreezing apparatus for frozen products, but also for a vacuum drying apparatus for food.

What is claimed:

1. A heating apparatus comprising a microwave heating means having microwave leakage-type waveguides, each waveguide having a plurality of microwave emitting openings extending along the advancing direction of microwave radiation, said waveguides being disposed in parallel with one another; radiation heating means having heat conducting members disposed along upper and lower surfaces of the microwave leakage-type waveguides; and high frequency heating means utilizing said microwave leakage-type waveguides as electrodes.

2. A heating apparatus as claimed in claim 1 wherein the heat conducting members are heat pipes.

3. A heating apparatus as claimed in claim 1 wherein the radiation heating means further comprises a plurality of hot medium ducts and said heat conducting members are each partly inserted in and connected to one of the hot medium ducts.

4. A heating apparatus as claimed in claim 1 wherein the radiation heating means further comprises a plurality of hot blast ducts and said heat conducting members are each partly inserted in and connected to one of the hot blast ducts.

5. A heating apparatus as claimed in claim 1 wherein the microwave leakage waveguides are arranged alternately in reverse, one with another, in microwave flowing direction.

* * * * *

UNITED STATES PATENT AND TRADEMARK OFFICE
CERTIFICATE OF CORRECTION

PATENT NO. : 4,435,629
DATED : March 6, 1984
INVENTOR(S) : COMBINATION HEATING APPARATUS It is certified that error appears in the above-identified patent and that said Letters Patent is hereby corrected as shown below:

[73] Assignee:, after "Osaka Gas Co., Ltd., Osaka, Japan", please add --Kabushiki Kaisha Sofard, Tokyo, Japan--.

Signed and Sealed this

Tenth Day of July 1984

[SEAL]

Attest:

GERALD J. MOSSINGHOFF

Attesting Officer

Commissioner of Patents and Trademarks